United States Patent [19]
Dabby et al.

[11] 3,916,182
[45] Oct. 28, 1975

[54] PERIODIC DIELECTRIC WAVEGUIDE FILTER

[75] Inventors: Franklin Winston Dabby, Ewing Township, Mercer County; Ami Kestenbaum, East Windsor Township, Mercer County; Un-Chul Paek, Lawrenceville, all of N.J.

[73] Assignee: Western Electric Company, Incorporated, New York, N.Y.

[22] Filed: Aug. 3, 1973

[21] Appl. No.: 385,270

Related U.S. Application Data

[63] Continuation-in-part of Ser. No. 282,205, Aug. 21, 1972, abandoned, which is a continuation-in-part of Ser. No. 236,090, March 20, 1972, abandoned.

[52] U.S. Cl. ...... 250/199; 350/96 WG; 350/162 SF
[51] Int. Cl. ................................................ H04b 9/00
[58] Field of Search ......... 250/199; 350/96 R, 96 T, 350/96 WG, 162 SF, 160 R, 161, 205, 175 GN, 311, 148

[56] References Cited
UNITED STATES PATENTS

| | | |
|---|---|---|
| 3,302,120 | 1/1967 | Kluver ................................ 250/199 |
| 3,434,774 | 3/1969 | Miller .............................. 350/96 WG |
| 3,542,536 | 11/1970 | Flam et al. ..................... 350/96 WG |
| 3,555,457 | 1/1971 | Fujisawa ............................. 250/199 |
| 3,617,917 | 11/1971 | Uchida .......................... 350/175 GN |
| 3,675,157 | 7/1972 | Kaminow et al. ............. 350/96 WG |
| 3,704,060 | 11/1972 | McNaney ...................... 350/96 WG |
| 3,717,769 | 2/1973 | Hubbard et al. ................. 350/96 R |
| 3,795,434 | 3/1974 | Ash .............................. 350/96 WG |

*Primary Examiner*—Benedict V. Safourek
*Attorney, Agent, or Firm*—B. W. Sheffield; G. D. Green

[57] ABSTRACT

An optical waveguide comprising either a substrate coated with a layer of optic material or a clad optic fiber. A periodic variation in the index of refraction of either: (1) the substrate and/or the optical layer, or (2) the core and/or cladding of the optic fiber, is introduced so that unwanted frequency components present in the optical signal passing through the waveguide are eliminated. The waveguide may be employed as a band-pass or a band-stop filter, or for phase-matching purposes. Various means are disclosed for altering the periodicity of the index of refraction to thereby tune the device.

43 Claims, 12 Drawing Figures

FIG. 2

$$\mathcal{E} = n_f^2 = n_1^2 + 2\delta n^2 \cdot \cos\left(\frac{2\pi}{d} \cdot z\right)$$

PERIODIC DIELECTRIC WAVEGUIDE FILTER

CROSS-REFERENCE TO RELATED APPLICATIONS

This application is a continuation-in-part of our co-pending application Ser. No. 282,205, filed Aug. 21, 1972, and entitled, "Lossless Optical Band-Pass Filter," which applicatin was a continuation-in-part of application Ser. No. 236,090, filed Mar. 20, 1972, both now abandoned. This application is assigned to the same assignee as the instant invention.

BACKGROUND OF THE INVENTION

1. Field of the Invention

Broadly speaking, this invention relates to optical devices. More particularly, in a preferred embodiment, this invention relates to an optical waveguide which exhibits a continuous filtering action, advantageous for the suppression of unwanted frequencies which may be present in the optical signal propagating through the guide.

In another embodiment of the invention, a discrete, optical band-pass filter is fabricated from a section of the waveguide which, if desired, may be tuned by the application of external energy to the waveguide.

2. Discussion of the Prior Art

The recent invention of the laser has led to the development of optical communication systems which are essentially analogs of established radio-frequency systems, except that the optical systems are far superior in terms of system bandwidth. There thus exist optical analogs of such well-known electrical devices as waveguides, coaxial cables, etc., as well as of discrete devices, such as amplifiers, modulators, and band-pass filters.

As is well known, in radio-frequency communications systems, it is frequently necessary to take steps to eliminate undesired propagation modes and to filter out unwanted frequency components which are generated as the radio-frequency signal is amplified and propagated along the system.

Because the power density which is found in a typical laser communication system may run as high as one million watts per square centimeter, optical waveguides, and discrete optical band-pass filters, which rely on absorption to provide filtering action, are not really practicable. Non-absorptive filters, which filter by reflection, are of course known, but such filters are bulk devices and, hence, noncompatible with integrated optics.

SUMMARY OF THE INVENTION

As a solution to this, and other problems, a first embodiment of the invention comprises an optical device including a layer of optical material having a periodic, spatial variation in the index of refraction thereof. In a second embodiment of the invention, the optical material is overlaid on a substrate of uniform index of refraction to thereby form an optical waveguide. In a third embodiment of the invention, the index of refraction of the optical material is uniform, but the index of refraction of the underlying substrate varies in a periodic manner.

In still further embodiments of the invention, the waveguide is a fiber-optic device with either the core, or the surrounding cladding, exhibiting a periodic index of refraction variation.

The invention, and its mode of operation, will be more fully understood from the following detailed description, when read in conjunction with the drawing, in which:

DETAILED DESCRIPTION OF THE INVENTION

Figure 1:
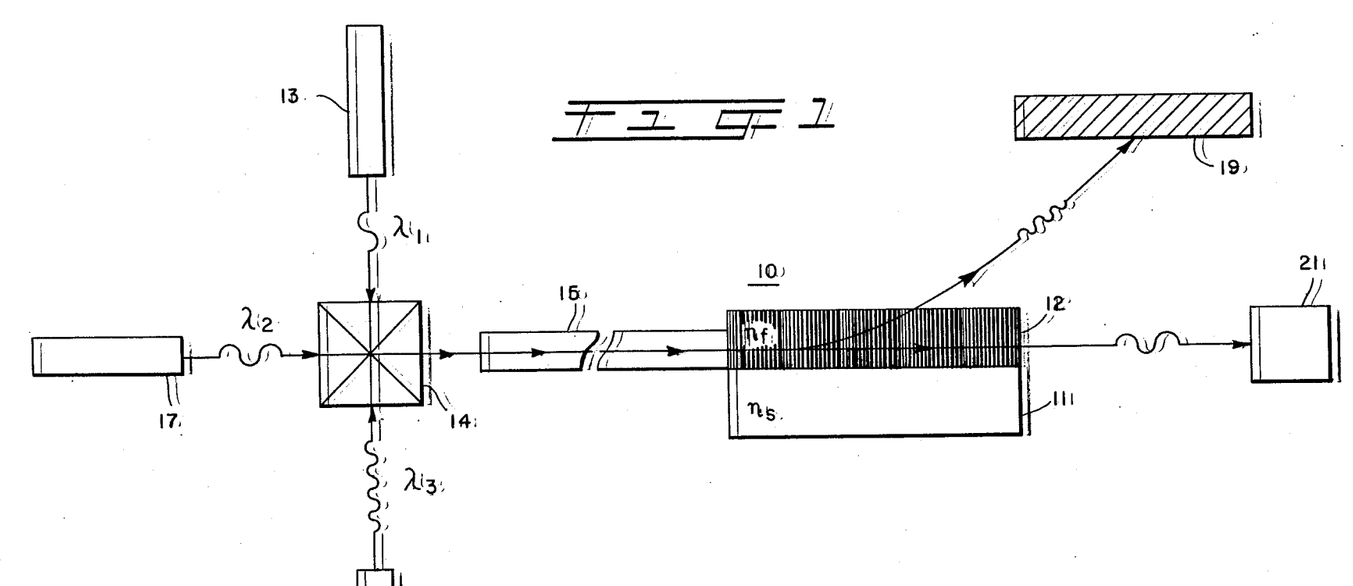
FIG. 1 is a partially diagrammatic, partially cross-sectional view of an optical waveguide, according to the invention.

FIG. 1 illustrates a portion of an optical waveguide according to the invention, as well as the typical operating environment therefor. As shown, optical waveguide 10 comprises a substrate 11, e.g., of glass, having a uniform index of refraction $n_s$ overlaid with a layer of optical material 12, e.g. of glass, having a spatially varying index of refraction $n_f$. The device is assumed to be located in a medium, such as air, having an index of refraction $n_a$. As is well known, for waveguide 10 to function as a waveguide, it is necessary that $n_f > n_a$ and $n_f > n_s$.

Figure 2:
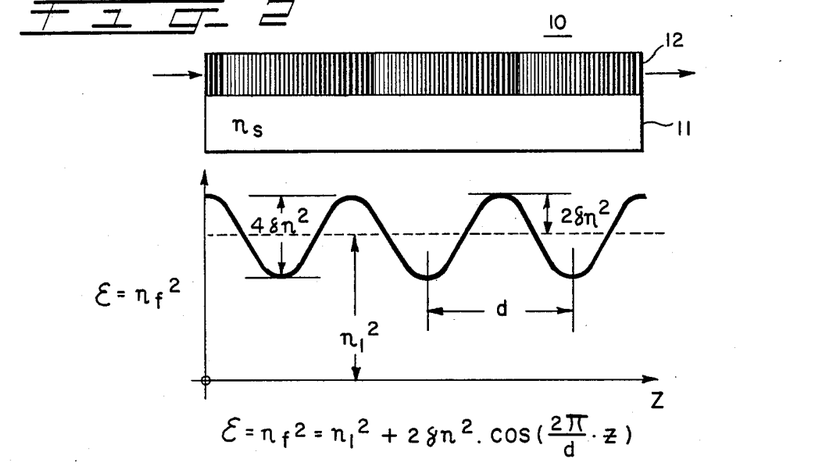
FIG. 2 is a cross-sectional view showing the optical waveguide of FIG. 1 in more detail.

Turning momentarily to FIG. 2, the waveguide 10 is depicted in more detail. As previously stated, the index of refraction $n_s$ of substrate 11 is uniform, but the index of refraction $n_f$ of layer 12 varies periodically. The index of refraction $n$ of a material can also be expressed in terms of the optical dielectric constant $\epsilon$ of the material, where $\epsilon = n^2$. The optical dielectric constant of layer 12 varies sinusoidally along the principal axis about some mean value, according to the formula:

$$\epsilon = n_f{}^2 = n_1{}^2 + 2\delta_n{}^2 \cos\left(\frac{2\pi}{d} z\right) \quad (1)$$

where,
  $\epsilon$ = the optical dielectric constant at any point in optical layer 12;
  $n_f$ = The index of refraction of optical layer 12;
  $n_1 2$ = the mean value of the optical dielectric constant of optical layer 12;

$2\delta_n 2$ = the amplitude in the sinusoidal variation in the optical dielectric constant;

d = the period of the variation in the optical dielectric constant; and z = the displacement along the direction of propagation.

Now, in accordance with well-known optical theory, substrate 11, optical layer 12 and the overlying medium together form an optical waveguide. If the index of refraction of layer 12 were uniform, light energy which was coupled into the waveguide would propagate therealong and could be coupled out at any point along the guide, typically, the other end thereof, provided, of course, that the frequency of the light source was sufficiently high so that the wavelength λ of the light was less than some predetermined maximum value, above which the waveguide is incapable of sustaining propagation. This upper propagation limit is determined, essentially, by the asymmetric geometry and indices of the device.

On the other hand, if the index of refraction of optical layer 12 is not uniform, but varies spatially, according to the relationship set forth in Equation (1), then propagation through the waveguide will not take place if the inequality $d < \lambda/(n_{ep} + n_s)$ is not satisfied. Accordingly, if light is introduced into the waveguide having a wavelength less than the lower propagation limit, the light will not be transmitted through the waveguide but will, rather, be deflected out of optical layer 12 into the atmosphere. In other words, light having a wavelength which exceeds the upper limit, or which falls below the lower limit, will not propagate through the waveguide, and the waveguide will act, therefore, as a true band-pass filter.

Returning now to FIG. 1, and an illustrative environment for the invention, light of wavelength $\lambda_1$ from a first optical source 13, for example, a continuous wave laser, is directed into optical-summing device 14, thence, via a coupling device 15, into filter 10. Coupling device 15 may comprise any of several known devices, for example, a prism, optical grating, lens, etc., etc. At the same time, light of wavelength $\lambda_2$ from a second optical source 17 and light of a wavelength $\lambda_3$ from a third optical source 18 are also directed into optical element 14, thence, via coupling device 15, into filter 10. It is assumed, in this example, that the wavelength $\lambda_1$ of source 13 lies above the long-wavelength cut-off point that is present in any asymmetric optical waveguide, including the waveguide of this invention. Accordingly, this light will not propagate through the filter. It is further assumed that $\lambda_3$, the wavelength of light source 18, is shorter than the minimum wavelength which can propagate through filter 10, that is to say, $\lambda_3/(n_{ep} + n_s) < d$, where d is the periodicity of the variation in the index of refraction in optical layer 12. Accordingly, the light from source 18 will be deflected out of the optical layer 12 to impinge upon some suitable blocking device 19, for example, a black metal heat sink, which will absorb, or harmlessly dissipate, the radiant energy. Thus, if $\lambda_2$, the wavelength of light from source 17, lies between the upper and lower propagation limits of filter 10, this light will be propagated through the filter to utilization device 21, which may comprise, for example, an optical detector, or other similar device.

Figure 3:
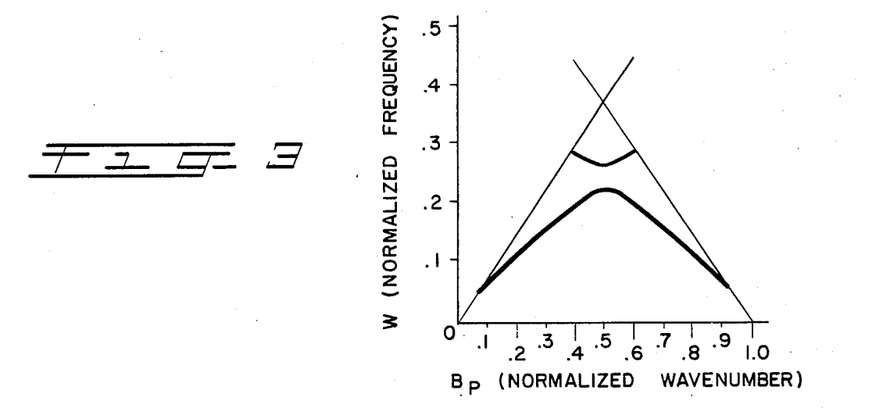
FIG. 3 is a graph showing the normalized dispersion curve of the waveguide of FIGS. 1 and 2 for a propagating mode.

FIG. 3 depicts the normalized dispersion curve of a waveguide according to this invention. The abscissa of the curve, $Bp = \beta pd/2\pi$, is the normalized wave number for the p'th mode, and $\beta p$ is the wave number for the mode in the guide. The ordinate of the curve, $W = d/\lambda$, is the normalized frequency of the light, where d is the periodicity of the optical dielectric constant variations. FIG. 3 was plotted for a TE mode, from theoretical calculations, on the assumption that $n_s = 1.4$, $n_a = 1.0$, and $n_1 = 2.5$ with an amplitude of optical dielectric constant $2\delta x_n^2 = 1.28$. As can be seen from FIG. 3, for $W < 0.05$ the curve does not exist. Hence, there will be no propagation at these frequencies. For $0.05 < W - 0.23$ the curve exists, and propagation through the guide will occur. For $0.23 < W < 0.26$ the curve again does not exist and there will be no propagation, but for $0.26 < W < 0.29$ the curve reappears and propagation will once more take place. For $W > 0.29$ the curve again does not exist and propagation will not take place.

The regions of propagation are defined by the exisence of confined space harmonics of all orders. When the transverse decay constant of the first space harmonic becomes imaginary or complex, propagation through the guide is no longer possible. The first order space harmonic becomes confined for $d > \lambda/(n_{ep} - n_s)$, where $n_{ep}$ is the effective index of refraction of the light of the p'the mode in the guide, and is equal to $\lambda \beta p/2\pi$ Other space harmonics, at these periodicities, are not confined, but their effect on propagation is less significant than that of first space harmonic scattering.

It should be appreciated that by properly adjusting the parameters, for example, $\delta_n$, the amplitude of the sinusoidal variation in the optical dielectric constant, the region between the propagating regions of FIG. 3 may be made arbitrarily small. Thus, the waveguide according to this invention can function equally as well as a stop-band filter of arbitrary non-passing filtering region.

The waveguide shown in FIGS. 1 and 2, or more practically a band-pass filter comprising a portion of the waveguide, may be tuned by altering the periodicity of the variation in the index of refraction of layer 12. This may be accomplished by any of several known techniques. For example, in FIG. 4 the variation in the index of refraction is initially effected by creating an interference pattern on the surface of optical layer 12. The interference pattern may be generated by splitting the output of a laser 22 by means of a beam splitter 23 and a pair of prisms or mirrors 24 and 25, and then simultaneously impinging the optical layer 12 with the two beams, as shown. The mutual interference between the two laser beams will create an interference pattern on the surface of the optical layer and, if the guide material is of the type whose refractive index may be altered by incident radiant energy, in the places where the light from the two sources is reinforced, the index of refraction of the optical layer 12 will be altered. In essence, this is a holographic technique and the difference in path length of the two beams must be less than the coherence length. Correspondingly, where the light from the two sources cancels out, the index of refraction will be unaltered, the net effect being to create a spatial variation in the index of refraction in the direction of propagation along the waveguide. This spatial variation may be permanent or temporary, depending upon the material of the waveguide. For example, if the material is a dichromated gelatin or a photoresist, the variation may be permanently recorded. Some "permanent" materials may also be erased, to redefine a new pattern, if desired.

Figure 4:
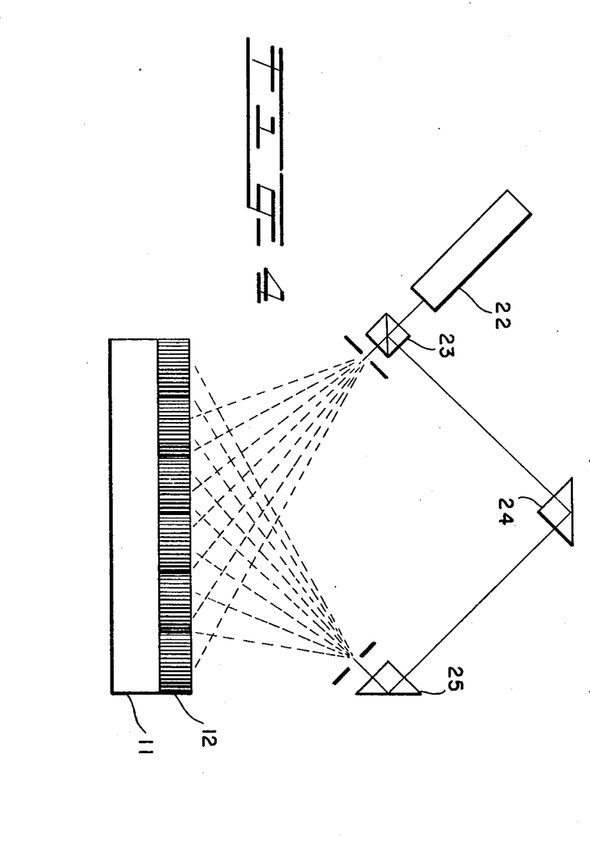
FIG. 4 is a partially diagrammatic, partially cross-sectional view of a portion of the optical waveguide of FIGS. 1 and 2, used as a band-pass filter and illustrating one method of adjusting the band pass thereof.

Accordingly, to the invention, the periodicity of a diffraction pattern produced by this technique, and hence, the periodicity of the spatial index variation, may be altered by changing the angle at which the two beams impinge upon the surface of optical layer 12, or by changing the frequency of the laser, or by a combination of these factors. This will cause the "dark" bands in the diffraction pattern to move further apart, or closer together, as the case may be, thereby producing a corresponding variation in the periodicity of the index of refraction variation in the underlying optical material.

Figure 5:
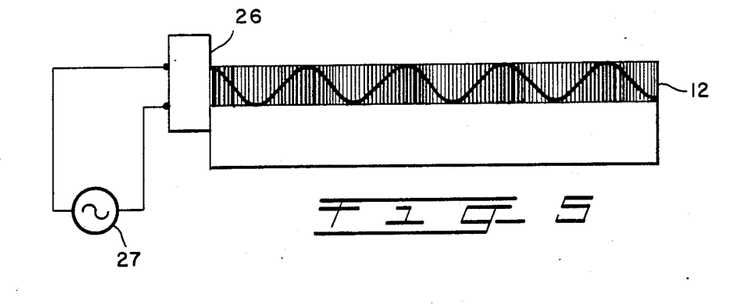
FIG. 5 is a partially diagrammatic, partially cross-sectional view of the optical filter of FIG. 4 illustrating another method of adjusting the band pass thereof.

FIG. 5 illustrates yet another technique for altering the periodicity of the variations. This technique comprises attaching, for example by bonding, an ultrasonic transducer 26, to one edge of optical layer 12. The transducer must, of course, be connected to some suitable source of energizing potential, such as a.c. source 27. The acoustic vibrations from transducer 26 will create a standing wave in optical layer 12 which, in accordance with well-known principles, will selectively alter the index of refraction of the layer. The periodicity of the change in the index of refraction may be altered by altering the periodicity of the standing wave. This, in turn, may be effected by altering the frequency of energizing source 27.

For those applications where it is less important to vary the band-pass of the filter, the variations in the index of refraction of optical layer 12 may be permanently effected by other techniques, for example, by selectively bombarding the optical layer with ions from an ion generator, selective metal ion exchange, etc.

It will also be apparent to one skilled in the art that periodic variations in the index of refraction of the waveguide comprising the substrate 11, the layer 12, and the overlying medium can comprise periodically indenting or corrugating the surface of the layer 12.

Figure 6:
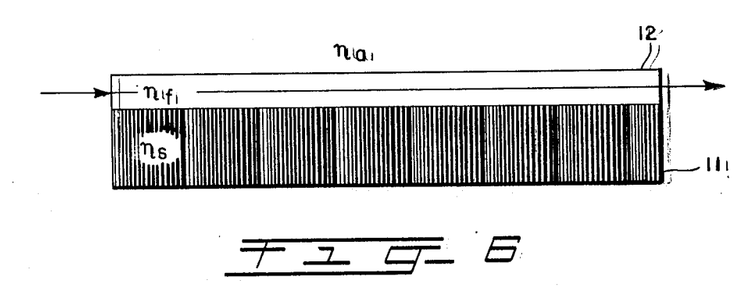
FIG. 6 is a cross-sectional view of another embodiment of the invention in which the index of refraction of the waveguide substrate varies periodically, rather than the optical layer itself.

Of course, it is entirely possible to maintain a uniform index of refraction in the material of the waveguide and to provide a periodic variation in the index of refraction of the substrate. FIG. 6 shows such an arrangement. The mathematical analysis is entirely analogous to that previously given and the performance of the filter is similar to that of the previous embodiments. It should be noted that, from a practical point of view, only the region of the substrate where the evanescent waves of the field in the optical layer exist need to be periodically varied. This region will constitute only the uppermost part of the substrate, next to the optical layer.

Figure 7:
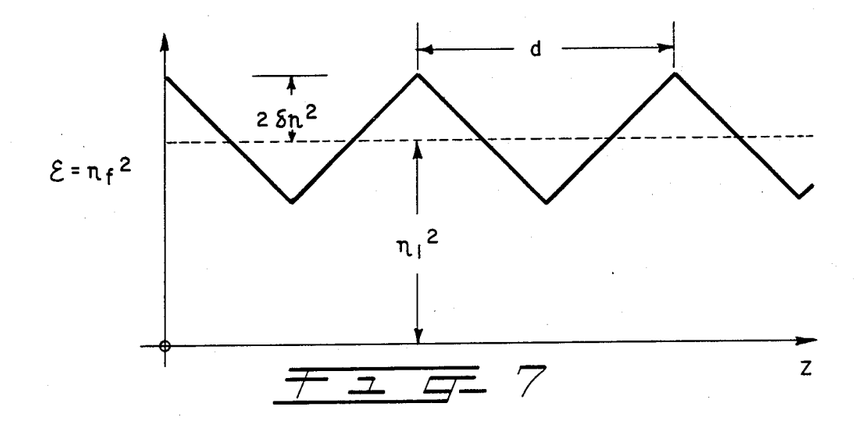
FIGS. 7 and 8 are graphs depicting triangular and square wave index of refraction variations, respectively.
Figure 8:
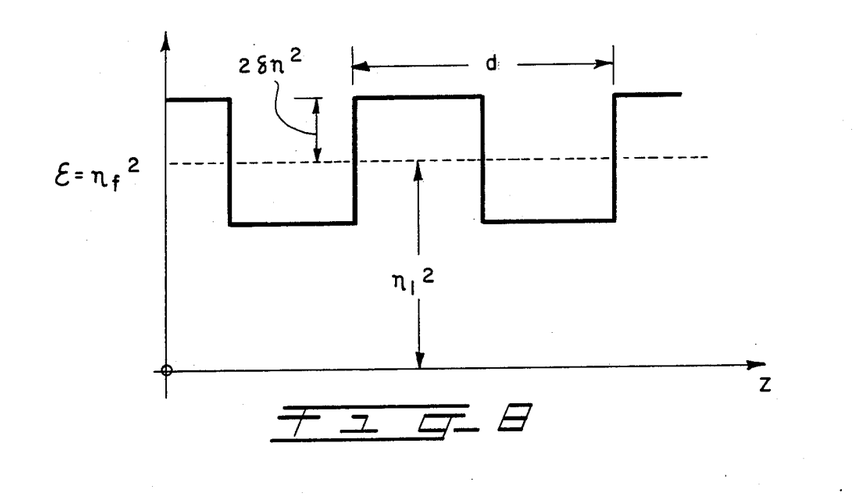

While the embodiments described above contemplate a periodic variation in the index of refraction that is characterized by a sinusoidal variation in the optical dielectric constant, the invention is not so limited. For example, as shown in FIGS. 7 and 8, respectively, the optical dielectric constant could be caused to change in a triangular wave fashion or in a square wave fashion, but from a practical standpoint, such variations are much more difficult to induce than a sinusoidal variation.

Further, the examples given above deal with planar geometry but one skilled in the art will appreciate that a similar analysis may be performed on nonplanar configurations. Thus, the invention may equally well be employed with square, circular rod and fiber-optic geometries.

In this latter regard, it should be noted that the term "substrate," as used in the specification and claims, should not be given its strict literal meaning as it is intended to encompass, for example, the core or cladding of a fiber-optic waveguide, as well as the planar support of a planar waveguide.

Figures 9, 10, 11:
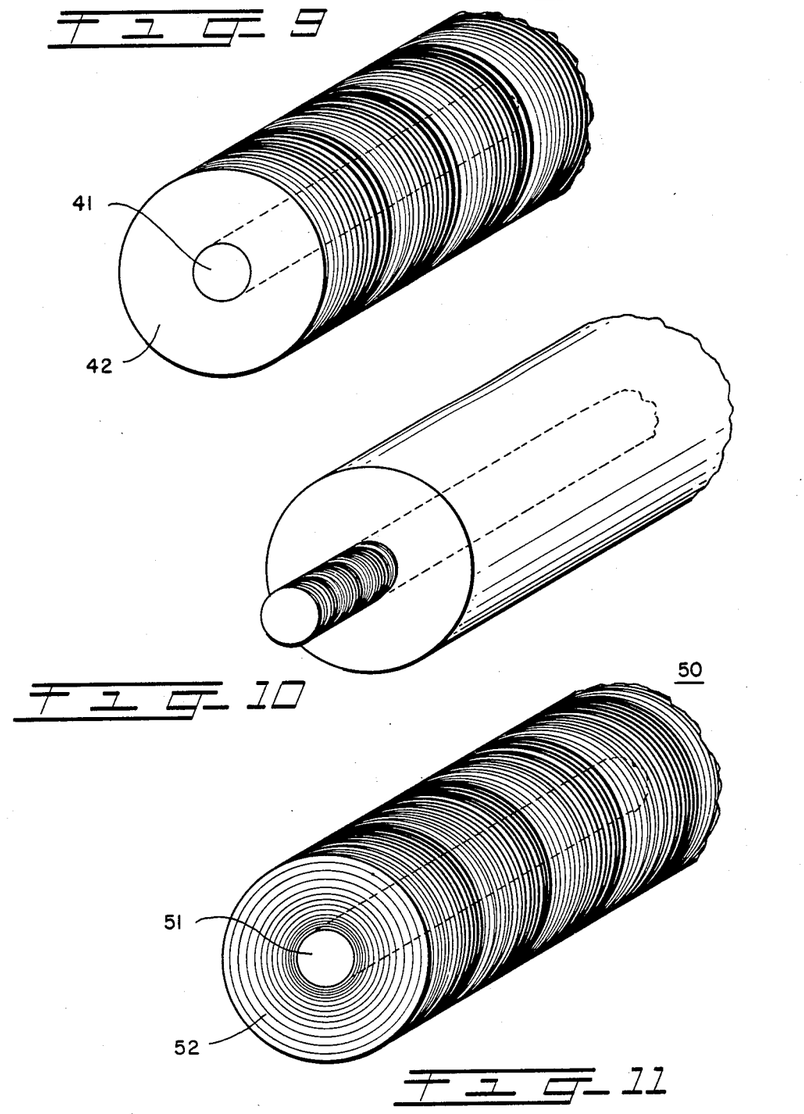
FIGS. 9, 10 and 11 are isometric views of another embodiment of the invention which utilized fiber optics.

For example, as shown in FIG. 9, the waveguide according to this invention may comprise a fiber-optic device 40 including a central core 41 and a layer of cladding 42. By analogy to the embodiment of the invention shown in FIGS. 1–8, a periodic variation in the index of refraction of the cladding 42 (or of the core 41) is induced and, as a result, the fiber-optic device will exhibit the same filtering properties as the above-described devices.

FIG. 10, for example, depicts a periodic variation in the index of refraction of the core 41, while the cladding 42 has a uniform index of refraction.

FIG. 11 illustrates yet another embodiment of the invention in which fiber-optic device 50 comprises a central core 51 and a cladding layer 52. As in the example of FIG. 9, there is a periodic index of refraction variation in cladding layer 52, in the direction of propagation, but in addition, a radial index of refraction gradient, which may be either in the cladding or the core.

As shown in FIG. 11, the waveguide, with filtering action, may be used, as a normal waveguide might be used, in a communications system, rather than a filter per se. In this respect, it is analogous to a helical millimeter waveguide in that, as the optical energy travels along the guide, any spurious or unwanted frequency components present in the optical signal will be suppressed continuously. Further, such a waveguide may be used for phase-matching purposes by varying either the amplitude or periodicity, or both, of the variation in the optical dielectric constant. Phase matching is essential for the efficiency of certain processes, such as frequency conversion, modulation, coupling between two or more waveguides, etc. etc. Either the planar waveguide of FIGS. 1–8 or the fiber-optic waveguides of FIGS. 9–11 may be employed, but for inter-city use, the fiber-optic guides are preferred.

Figure 12:
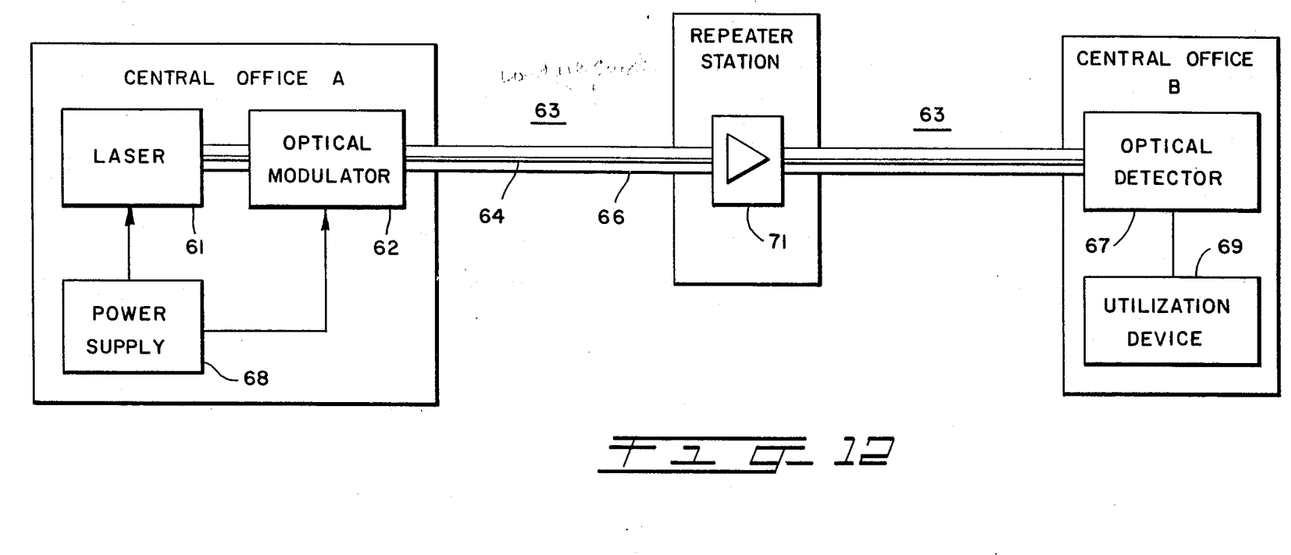
FIG. 12 is a partially schematic, partially diagrammatic view of an optical communications system, according to the invention.

In the example shown in FIG. 12, light from a laser 61 is passed through an optical modulator 62, thence, to an optical waveguide 63 comprising a central core 64 and one (or more) layers of optic cladding 66, or no cladding. As previously discussed, either central core 64 or cladding 66 can have a periodic variation in the index of refraction. Laser 61 and modulator 62 are connected to some suitable power supply 68, and all are located in a central office at some first location. At the distant end, the optical waveguide 63 is connected to some suitable optical demodulator 67 which in turn is connected to a utilization device 69, for example, a telephone carrier channel bank. One or more optical amplifiers 71 may be positioned in the optical path of waveguide 63 to amplify the optical signal which will, of course, be attenuated as it travels along the waveguide. Because waveguide 63 acts as a filter, similar to that disclosed above with reference to FIGS. 1–8, spurious or unwanted frequency components in the optical signal will be eliminated, or attenuated to such a low level that from a practical standpoint they can be ignored. Such unwanted components may be generated, for example, by non-linearities in the optical path, such as the waveguide itself, or the optical amplifiers 71.

One skilled in the art may make various substitutions and changes to the elements as shown without departing from the spirit and scope of the invention.

What is claimed is:

1. A device for selectively filtering light transmitted through an optical waveguide having a substrate element and an overlying layer element, characterizd by a region of one of the elements having a periodic, spatial variation in the index of refraction along the propagation axis of the waveguide, the period d of said variation being less than $\lambda/(n_{ep} - n_s)$, where $\lambda$ is the free-space wavelength of at least one of the components of the light propagating through the waveguide, $n_{ep}$ is the effective index of refraction in the guide of the component, and $n_s$ is the index of refraction of the substrate element.

2. The device according to claim 1 wherein said periodic variation is a sinusoidal variation in the optical dielectric constant according to the equation:

$$\epsilon = n_f{}^2 = n_1{}^2 + 2\delta_n{}^2 \cos\left(\frac{2\pi}{d} \cdot z\right)$$

where,
$\epsilon$ = the optical dielectric constant at any point in said region;
$n_f$ = the index of refraction of said region;
$n_1{}^2$ = the mean value of the optical dielectric constant of said region;
$2\delta_n{}^2$ = the amplitude of the sinusoidal variation in the optical dielectric constant;
$d$ = the period of the variation in the optical dielectric constant;
$z$ = the displacement along the axis of propagation of the device.

3. The device according to claim 1 wherein said periodic variation is non-sinusoidal.

4. The device according to claim 1 further comprising means for altering the periodicity of the variation in the index of refraction in said region.

5. Apparatus for filtering optical energy, which comprises:
a substrate having a first uniform index of refraction;
a layer of optical material overlaid on said substrate, said material exhibiting the property that the index of refraction thereof may be altered by the application of radiant energy thereto; and
means for supplying first and second temporally coherent sources of optical energy to said layer, said first and second sources impinging upon said layer to create an interference pattern on the surface thereof, said interference pattern causing a corresponding periodic variation in the index of refraction of said optical layer, whereby said optical layer and said substrate function as a band-pass optical filter.

6. Apparatus for filtering optical energy, which comprises:
a substrate having a first, uniform index of refraction;
a layer of light-conducting material overlaid on said substrate, said layer having a second index of refraction which is greater than the index of refraction of said substrate; and
means for establishing an acoustical standing wave in said layer, said standing wave inducing a corresponding periodic change in the index of refraction of said layer.

7. The apparatus according to claim 6 wherein said establishing means comprises a transducer positioned proximate one end of said layer; and
means for supplying a source of alternating current to said transducer.

8. The apparatus according to claim 7 wherein said transducer includes a piezo-electrical crystal.

9. Apparatus for filtering optical energy, which comprises:
a band-pass, optical filter comprising:
a substrate having a first, uniform index of refraction; and
a layer of light-conducting material overlaid on said substrate, said layer having a periodically varying index of refraction in the direction of propagation of said filter;
means for applying optical energy to said optical filter;
means for dissipating optical energy escaping from said band-pass filter, said escaping energy having a wavelength less than the minimum wavelength of propagation in said filter; and
a utilization device positioned proximate the output of said filter for receiving the energy from said source which succeeds in passing through said filter.

10. An optical waveguide for transmitting optical information from a first location to a second location, comprising:
a substrate having a first index of refraction which varies periodically along the direction of propagation of the waveguide; and
a layer of light-conducting material overlaid on said substrate, said layer having a second, uniform index of refracton, the index variation in the substrate existing therein for at least that portion thereof in contact with said layer, whereby unwanted frequency components present in, or developed during the propagation of said optical information as it travels along said waveguide, are suppressed.

11. The optical waveguide according to claim 10 wherein said periodic variation is a sinusoidal variation in the optical dielectric constant, according to the equation:

$$\epsilon = n_s{}^2 = n_1{}^2 + 2\delta_n{}^2 \cos\left(\frac{2\pi}{d} \cdot z\right)$$

where,
$\epsilon$ = the optical dielectric constant at any point in the substrate;
$n_f$ = the index of refraction of the substrate;
$n_1{}^2$ = the mean value of the optical dielectric constant of the substrate;
$2\delta_n{}^2$ = the amplitude of the sinusoidal variation in the optical dielectric constant;
$d$ = the period of the variation in the optical dielectric constant;
$z$ = the displacement along the axis of propagation of the waveguide.

12. The optical waveguide according to claim 10 wherein said periodic variation is non-sinusoidal.

13. The optical waveguide according to claim 10 further comprising means for varying the periodicity of said periodic variation in said index of refraction.

14. Apparatus for filtering optical energy, which comprises:
- a substrate having a first index of refraction;
- an layer of light-conducting material overlaid on said substrate, said optical layer having a second index of refraction which is greater than the index of refraction of said substrate; and
- means for establishing an acoustical standing wave in said substrate, said standing wave inducing a corresponding periodic change in the index of refraction of said substrate.

15. The apparatus according to claim 14 wherein said establishing means comprises a transducer positioned proximate one end of said substrate; and
- means for supplying a source of alternating current to said transducer.

16. The apparatus according to claim 15 wherein said transducer includes a piezo-electrical crystal.

17. An optical transmission system, which comprises:
- an optical waveguide comprising a substrate and at least one layer of light-conducting material overlaid thereon, at least one of the components of said waveguide having a periodic variation in the index of refraction thereof;
- means for introducing modulated optical information into one end of said waveguide; and
- an optical demodulator proximate the other end of said waveguide.

18. The optical transmission system according to claim 17 further comprising:
- at least one amplifying means, positioned intermediate the ends of said waveguide, for amplifying the optical information traveling in said waveguide.

19. The optical transmission system according to claim 17 wherein said introducing means comprises:
- an optical maser; and
- an optical modulator positioned intermediate the optical maser and the end of said waveguide.

20. An optical band-pass filter having a high attenuation for optical signals having frequencies above an upper predetermined limit and below a lower predetermined limit, and low attenuation for signals having optical frequencies lying between said upper and lower limits, which comprises:
- a substrate having a first, uniform index of refraction; and
- a layer of light-conducting material overlaid on said substrate, said layer having a second index of refraction which varies periodically along the direction of propagation of said filter.

21. The optical band-pass filter according to claim 20 wherein said periodic variation is a sinusoidal variation in the optical dielectric constant according to the equation:

$$\epsilon = n_f{}^2 = n_1{}^2 + 2\delta_n{}^2 \cos\left(\frac{2\pi}{d} \cdot z\right)$$

where,
- $\epsilon$ = the optical dielectric constant at any point in the layer;
- $n_f$ = the index of refraction of the layer;
- $n_1{}^2$ = the mean value of the optical dielectric constant of the layer;
- $2\delta_n{}^2$ = the amplitude of the sinusoidal variation in the optical dielectric constant;
- $d$ = the period of the variation in the optical dielectric constant;
- $z$ = the displacement along the axis of propagation of the filter.

22. the optical band-pass filter according to claim 20 wherein said periodic variation is non-sinusoidal.

23. The optical band-pass filter according to claim 20 further comprising means for varying the periodicity of said periodic variation in said index of refraction.

24. An optical band-pass filter having a high attenuation for optical signals having frequencies above an upper predetermined limit and below a lower predetermined limit, and low attenuation for signals having optical frequencies lying between said upper and lower limits, which comprises:
- a substrate having a first index of refraction which varies periodically along the direction of propagation in at least the vicinity of the optical layer of said filter; and
- a layer of light-conducting material overlaid on said substrate, said layer having a second, uniform index of refraction.

25. The optical band-pass filter according to claim 24 wherein said periodic variation is a sinusoidal variation in the optical dielectric constant according to the equation:

$$\epsilon = n_f{}^2 = n_1{}^2 + 2\delta_n{}^2 \cos\left(\frac{2\pi}{d} \cdot z\right)$$

where,
- $\epsilon$ = the optical dielectric constant at any point in the substrate;
- $n_f$ = the index of refraction of the substrate;
- $n_1{}^2$ = the mean value of the optical dielectric constant of the substrate;
- $2\delta_n{}^2$ = the amplitude of the sinusoidal variation in the optical dielectric constant;
- $d$ = the period of the variation in the optical dielectric constant;
- $z$ = the displacement along the axis of propagation of the filter.

26. The optical band-pass filter according to claim 24 wherein said periodic variation is non-sinusoidal.

27. The optical band-pass filter according to claim 24 further comprising means for varying the periodicity of said periodic variation in said index of refraction.

28. An optical waveguide filter which comprises:
- a cylindrical core of light-conducting material having a first, uniform index of refraction in the direction of propagation; and
- at least one cylindrical layer of cladding about said core, said layer having a second index of refraction which varies periodically along the direction of propagation of said waveguide.

29. The filter according to claim 28 wherein said core has, in addition, a radial index of refraction gradient.

30. The filter according to claim 28 wherein said at least one layer of cladding has, in addition, a radial index of refraction gradient.

31. The filter according to claim 28 wherein said periodic variation is a sinusoidal variation in the optical dielectric constant, according to the equation:

$$\epsilon = n_f{}^2 = n_1{}^2 + 2\delta_n{}^2 \cos\left(\frac{2\pi}{d} \cdot z\right)$$

where,
 $\epsilon$ = the optical dielectric constant at any point in the cladding;
 $n_f$ = the index of refraction of the cladding;
 $n_1^2$ = the mean value of the optical dielectric constant of the cladding;
 $2\delta_n^2$ = the amplitude of the sinusoidal variation in the optical dielectric constant;
 $d$ = the period of the variation in the optical dielectric constant;
 $z$ = the displacement along the axis of propagation of the filter.

32. The device according to claim 28 wherein said periodic variation is non-sinusoidal.

33. The device according to claim 28 further comprising means for altering the periodicity of the variation in the index of refraction.

34. An optical transmission system, which comprises:
 an optical waveguide comprising a cylindrical core and at least one cylindrical layer of cladding about said core, said cladding having a periodic variation in the index of refraction thereof;
 means for introducing modulated optical information into one end of said waveguide; and
 an optical demodulator proximate the other end of said waveguide.

35. The optical transmission system according to claim 34 further comprising:
 at least one amplifying means, positioned intermediate the ends of said waveguide, for amplifying the optical information in said waveguide.

36. The optical transmission system according to claim 34 wherein said introducing means comprises:
 an optical maser; and
 an optical modulator positioned intermediate the optical maser and the end of said waveguide.

37. An optical waveguide filter which comprises:
 a cylindrical core of light-conducting material having a first index of refraction which varies periodically along the direction of propagation of the waveguide; and
 at least one cylindrical layer of cladding about said core, said layer having a second, uniform index of refraction in the direction of propagation of the waveguide.

38. The waveguide filter according to claim 37 wherein said periodic variation is a sinusoidal variation in the optical dielectric constant according to the equation:

$$\epsilon = n_f^2 = n_1^2 + 2\delta_n^2 \cos\left(\frac{2\pi}{d} \cdot z\right)$$

where,
 $\epsilon$ = the optical dielectric constant at any point in the core;
 $n_f$ = the index of refraction of the core;
 $n_1^2$ = the mean value of the optical dielectric constant of the core;
 $2\delta_n^2$ = the amplitude of the sinusoidal variation in the optical dielectric constant;
 $d$ = the period of the variation in the optical dielectric constant;
 $z$ = the displacement along the axis of propagation of the filter.

39. The device according to claim 37 wherein said periodic variation is non-sinusoidal.

40. The device according to claim 37 further comprising means for altering the periodicity of the variation in the index of refraction.

41. An optical transmission system, which comprises:
 an optical waveguide comprising a cylindrical core having a periodic variation in the index of refraction in the direction of propagation of the waveguide, and at least one cylindrical layer of cladding about said core, said cladding having a uniform index of refraction;
 means for introducing modulated optical information into one end of said waveguide; and
 an optical demodulator proximate the other end of said waveguide.

42. The optical transmission system according to claim 41 further comprising:
 at least one amplifying means, positioned intermediate the ends of said waveguide, for amplifying the optical information in said waveguide.

43. The optical transmission system according to claim 41 wherein said introducing means comprises:
 an optical maser; and
 an optical modulator positioned intermediate the optical maser and the end of said waveguide.

* * * * *

UNITED STATES PATENT OFFICE
CERTIFICATE OF CORRECTION

Patent No. __3,916,182__ Dated __October 28, 1975__

Inventor(s) __F. W. DABBY, A. KESTENBAUM, U. C. PAEK__

It is certified that error appears in the above-identified patent and that said Letters Patent are hereby corrected as shown below:

In the specification, Column 2, line 30, "utilized" should read --utilizes--; line 60, that portion of the equation reading
" $\epsilon = n_f 2$ " should read -- $\epsilon = n_f^2$ --;
line 67, " $n_1 2$ " should read -- $n_1^2$ --.

Column 3, line 1, " $2\delta_n 2$ " should read -- $2\delta_n^2$ --.

Column 4, line 8, " $2\delta x_n^2$ " should read -- $2\delta n^2$ --;

line 10, "0.05 < W -0.23" should read --0.05 < W < 0.23--;
line 24, "p'the" should read --p'th--; line 25, " $\lambda\beta p/2\pi$Other" should read -- $\lambda\beta p/2\pi$. Other--.

In the claims, Column 10, line 5, "22. the" should read --22. The--. Column 12, line 6, that portion of the equation reading " $\left(\frac{2\pi^2}{d} \cdot z\right)$ " should read -- $\left(\frac{2\pi}{d} \cdot z\right)$ --.

Signed and Sealed this

Twelfth Day of October 1976

[SEAL]

Attest:

RUTH C. MASON
*Attesting Officer*

C. MARSHALL DANN
*Commissioner of Patents and Trademarks*